(12) United States Patent
Tsai

(10) Patent No.: US 8,871,327 B2
(45) Date of Patent: Oct. 28, 2014

(54) CAMOUFLAGE STRUCTURE CAPABLE OF ALTERING ITS APPEARANCE

(75) Inventor: Chen-Chu Tsai, Dajla Township, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 520 days.

(21) Appl. No.: 13/053,645

(22) Filed: Mar. 22, 2011

(65) Prior Publication Data

US 2012/0148797 A1 Jun. 14, 2012

(30) Foreign Application Priority Data

Dec. 8, 2010 (TW) .............................. 99142892 A

(51) Int. Cl.
*F41H 3/00* (2006.01)
*G02F 1/1333* (2006.01)
(Continued)

(52) U.S. Cl.
CPC .............. *B32B 5/12* (2013.01); *B32B 2437/00* (2013.01); *B32B 2307/402* (2013.01); *F41H 3/02* (2013.01); *B32B 2571/02* (2013.01); *F41H 3/00* (2013.01); *B32B 2307/202* (2013.01); *B32B 5/26* (2013.01); *B32B 2307/40* (2013.01); *Y10S 428/913* (2013.01); *Y10S 428/919* (2013.01)
USPC ............. 428/137; 428/17; 428/913; 428/919; 359/265; 359/266; 359/275; 359/322; 252/299.01; 252/582; 252/583; 252/586

(58) Field of Classification Search
CPC .............. F41H 3/00; F41H 3/02; G02F 1/23; G02F 1/25; G01F 1/1533
See application file for complete search history.

(56) References Cited

U.S. PATENT DOCUMENTS 5,846,614 A * 12/1998 Conner ........................... 428/15
6,338,292 B1 1/2002 Reynolds et al.
(Continued)

FOREIGN PATENT DOCUMENTS

DE 102006049633 * 4/2008 ............... C09K 9/00
EP 564127 A2 * 10/1993 ............... H04M 1/02
(Continued)

OTHER PUBLICATIONS

Invernale et al., All-Organic Electrochromic Spandex, Jan. 2010, ACS Appl. Mater. Interfaces, 2010, 2 (1), pp. 296-300.*

(Continued)

*Primary Examiner* — Aaron Austin
*Assistant Examiner* — Jeff Vonch
(74) *Attorney, Agent, or Firm* — Muncy, Geissler, Olds & Lowe, P.C.

(57) ABSTRACT

A camouflage structure, capable of altering its appearance, comprises a camouflage graphic layer and a color-changing layer disposed on the camouflage graphic layer. Originally, the camouflage structure presents a first color state. After the color-changing layer changes the color by driving methods, the camouflage structure presents a second color state. For example, a transparent or semi-transparent color-changing layer able to reflect or emitting red light could be disposed on the woodland camouflage graphic layer, which allows for the overall appearance to change from the greenish woodland camouflage to the brownish desert camouflage. Alternatively, the camouflage structure could comprise a greenish camouflage graphic layer made of material with red-shift characteristics, which means the greenish camouflage graphic layer consists of different colors of chromic materials with reversible red-shift characteristics. The greenish camouflage graphic layer can be red-shifted by driving methods so as to present an appearance of brownish desert camouflage.

7 Claims, 5 Drawing Sheets

(51) Int. Cl.

| | | |
|---|---|---|
| G02F 1/155 | (2006.01) | |
| G02F 1/17 | (2006.01) | |
| G02F 1/23 | (2006.01) | |
| G02F 1/25 | (2006.01) | |
| B32B 3/10 | (2006.01) | |
| C09K 19/02 | (2006.01) | |
| B32B 5/26 | (2006.01) | |
| B32B 5/12 | (2006.01) | |
| F41H 3/02 | (2006.01) | |

(56) References Cited

U.S. PATENT DOCUMENTS

| | | | |
|---|---|---|---|
| 6,475,559 B1 | 11/2002 | Bettinger | |
| 6,674,504 B1 | 1/2004 | Li et al. | |
| 7,044,614 B2 | 5/2006 | Levy et al. | |
| 8,736,942 B2 * | 5/2014 | Risser et al. | 359/270 |
| 2002/0074937 A1 * | 6/2002 | Guberman et al. | 313/511 |
| 2002/0141033 A1 * | 10/2002 | Ferraris et al. | 359/267 |
| 2004/0009729 A1 * | 1/2004 | Hill et al. | 442/208 |
| 2004/0201878 A1 * | 10/2004 | Agrawal et al. | 359/266 |
| 2004/0213982 A1 * | 10/2004 | Touzov | 428/304.4 |
| 2006/0172135 A1 * | 8/2006 | Agrawal et al. | 428/411.1 |
| 2007/0220427 A1 | 9/2007 | Briancon et al. | |
| 2010/0040844 A1 * | 2/2010 | Larson | 428/203 |
| 2011/0095931 A1 * | 4/2011 | Child | 342/3 |
| 2012/0211156 A1 * | 8/2012 | Harvey et al. | 156/277 |

FOREIGN PATENT DOCUMENTS

| | | | | |
|---|---|---|---|---|
| FR | 2827669 A1 * | 1/2003 | | F41H 3/00 |
| JP | 08137411 A * | 5/1996 | | G09F 9/30 |
| JP | 2000027081 | 1/2000 | | |
| TW | 513601 | 6/1991 | | |
| TW | 200708040 | 2/2007 | | |
| TW | 200928538 | 7/2009 | | |
| TW | 201033713 | 9/2010 | | |
| WO | WO 2010058346 A2 * | 5/2010 | | H05K 1/00 |

OTHER PUBLICATIONS

Truscio, Color Mixing, Mar. 2010.*
McKee, Kent W. et al., "Active Camouflage Technologies", Military Technology, Jul. 2009, pp. 64-71.
Prusten, Mark, "High Dynamic Range Image Rendering of Color in Chameleons Camouflage Using Optical Thin Films", The Nature of Light: Light in Nature II, 2008, pp. 705709-1-8, vol. 7057.
Lin, Huei-Yung et al., "A Framework of View-Dependent Planar Scene Active Camouflage", Canadian Conference on Computer and Robot Vision, 2008, pp. 319-325.
Beaupré, Serge, et al., "Multicolored Electrochromic Cells Based on Poly(2,7-Carbazole) Derivatives for Adaptive Camouflage", Chem. Mater, 2009, 1504-1513, vol. 21.

* cited by examiner

CAMOUFLAGE STRUCTURE CAPABLE OF ALTERING ITS APPEARANCE

This application claims the benefit of Taiwan application Serial No. 99142892, filed Dec. 8, 2010, the subject matter of which is incorporated herein by reference.

BACKGROUND

1. Field of the Invention

The disclosure relates in general to a camouflage structure, and more particularly to a camouflage structure capable of altering its appearance.

2. Description of the Related Art

It has been one of the major concerns of soldiers that whether or not they were being concealed in the combat field to have better surviving chance. Camouflage, having capability of concealment and deception, works by tricking the eye and brain and how they recognize color, volume and shape. Because only a small area of the eye perceives color, the brain does a lot of filling in as it processes images. Camouflage takes advantage of this by helping an observer see the pattern as part of the background. Generally, soldiers in the different combat fields requires different combat uniforms having specific camouflage patterns, such as woodland camouflage patterns, desert camouflage patterns and marine camouflage patterns. It can be imagined how dangerous it is if the soldier in the different combat fields wears the combat uniform with inadequate camouflage patterns. Also, there is not a mono-type of environment of the combat fields. It is desired to develop a camouflage product with good adaptability and capable of changing the colors of camouflage patterns in response to the environmental change. The camouflage pattern of MultiCam®, proposed by Crye Precision, could be one of the top three products recently having good adaptability to across different environments including forest and desert. MultiCam® is a 7-color multi-environment camouflage pattern developed by Crye Precision in conjunction with U.S. Army Soldier Systems Center, and has been used as combat uniforms for some U.S. Army soldiers that will blend in with their environment better and make them harder to be seen.

The camouflage pattern of MultiCam® was selected by conducting large amounts of the photo-simulation study, including photographs taken in desert, woodland, cropland and mountain terrain settings. The developer also tracked the light, the seasonal and elevation changes that affect any one region and tried to factor all this together, and all the factors are analyzed by the computer to create a camouflage pattern. After numerous prototyping and field testing for pattern improvement, a highly adaptive and effective pattern Multi-Cam® is created, and the test showed that MultiCam® clearly outperformed the existing Universal Camouflage Pattern (UCP) in providing concealment. The design takes advantage of the way the human eye and brain perceives shape, volume, and color. Since only a very small portion of the human eye perceives color, the brain does a lot of "filling-in" for the eye. The unique design of MultiCam® takes advantage of this principle and helps the observer to "see" the pattern as part of the background. This helps the wearer's profile begin to lose its edge and fade into whatever color or shape surrounds him. It works on the principle that an observer can see something but still not recognize it as anything to be interested in. Thus, the pattern of MultiCam® is designed to reflect some of the surrounding colors of the environment. It takes on an overall green appearance when under a green forest canopy and an overall tan look when in the open desert. By adapting to varying local lighting conditions, the pattern blends well in many environments, elevations, seasons, weather conditions, and times of the day. The camouflage pattern of MultiCam®, workings by tricking the eye and brain, tells an observer see the pattern as part of the background, and the developer said that a person wearing MultiCam® is able to across a wider range of environments (such as deserts, woodlands and cities) and seasons. However, the pattern of MultiCam® is still a combination and arrangement of millions of small blocks with unchangeable colors, not changeable colors.

For achieving the concealment and deception effect, other pixelized methods, which utilizes the pixel drive theory of the traditional liquid crystal display to change the color of each position by the corresponding pixel, have been provided. However, the traditional pixelized camouflage structures have considerable problems, such as complicated structural designs, difficult to drive and high cost of fabrication, and not suitable for mass productions.

SUMMARY

According to an embodiment of the present disclosure, a camouflage structure capable of altering its appearance comprises a camouflage graphic layer and a color-changing layer disposed on the camouflage graphic layer. The camouflage structure originally presents a first color state, and presents a second color state after the color-changing layer changes the color by a driving method.

According to another embodiment of the present disclosure, a camouflage structure capable of altering its appearance at least comprises a greenish camouflage graphic layer, made of at least one of chromic materials with reversible red-shift characteristics. The greenish camouflage graphic layer is red-shifted by a driving method so as to present a brownish desert camouflage state.

The disclosure will become apparent from the following detailed description of the preferred but non-limiting embodiments. The following description is made with reference to the accompanying drawings.

DETAILED DESCRIPTION

The embodiments of the present disclosure disclose the camouflage structure capable of altering its appearance between the greenish camouflage and the brownish desert camouflage, depending on the practical situation of the users for matching the colors of background; therefore, the adaptive camouflage effect can be achieved and the "invisibility" of the products in the applications is increased consequently. Also, the camouflage structure of the embodiment has a simple structural construction and can be manufactured with low cost of fabrication, thereby solving the problems the traditional pixelized camouflage structures have, such as complicated designs, difficult to drive and high cost of fabrication. Thus, the camouflage structure of the embodiment is suitable for mass productions.

Moreover, the camouflage structure of the embodiment can be widely used in a variety of applications, such as military gears (ex: weapons or combat suit) and daily life products (ex: clothing or outer shells of products), for increasing the values and functions of the products in the applications.

The first and second embodiments are provided to demonstrate, but not intended to limit, the camouflage structures according to the present disclosure. The modifications and variations can be made without departing from the spirit of the disclosure to meet the requirements of the practical applications.

First Embodiment

Figure 1:
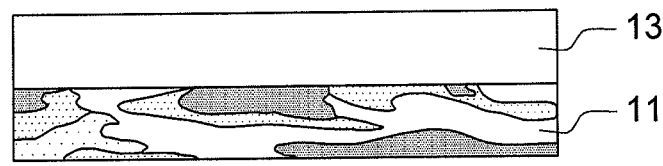
FIG. 1 simply illustrates a camouflage structure according to the first embodiment of the disclosure.

FIG. 1 simply illustrates a camouflage structure according to the first embodiment of the disclosure. The camouflage structure 1 of FIG. 1 includes a camouflage graphic layer 11, and a color-changing layer 13 disposed on the camouflage graphic layer 11. The color-changing layer 13 is able to change the color by a driving method, such as one of electric driving methods, optical driving methods, thermo-driving methods, and magnetic driving methods. The camouflage structure 1 originally presents a first color state. After the color-changing layer 13 alters the color, the camouflage structure 1 would present a second color state.

In an embodiment, the camouflage graphic layer 11 is a greenish (woodland) camouflage graphic layer. A transparent or semi-transparent color-changing layer 13, able to change color between transparent and red, could be disposed on the greenish camouflage graphic layer 11. When the transparent or semi-transparent color-changing layer 13 shows no color change, the camouflage structure 1 presents its original green color (i.e. the first color state). When the color-changing layer 13 turns red, the camouflage structure 1 presents the brownish color (i.e. the second color state) and turns to the brownish desert camouflage, since a red-colored layer lies on the greenish camouflage graphic layer 11.

Moreover, the camouflage structure 1 can further present one or more intermediate color states between the first and second color states, by adjusting the color-changing extent of the color-changing layer 13. A transparent or semi-transparent color-changing layer 13 able to turn red disposed on a greenish camouflage graphic layer is exemplified for illustration. When the color-changing layer 13 turns to light red, the camouflage structure 1 would present a dark green color with light tones of red (i.e. the intermediate color state) from the original green color. When the color-changing extent of the color-changing layer 13 is increased and turns to deep red, the camouflage structure 1 would present a brownish color (i.e. the second color state) from the dark green color with dark tones of red. Therefore, the camouflage structure 1 of the embodiment is able to alter its appearance from the greenish (woodland) camouflage to the brownish desert camouflage. It is, of course, noted that the camouflage structure 1 can present several different intermediate colors, depending on the abundance of the color-changing extent and the tones of the color-changing layer 13 (similar to the grayscale between black and white, which includes many different colors with different shades of gray, i.e. light gray to deep gray). The invention has no particular limitations to the number of the intermediate colors.

To achieve the adaptive camouflage effect, cholesteric liquid crystals can be used as the material of the color-changing layer 13 in the camouflage structure of the embodiment. The cholesteric liquid crystals as thermochromatic elements are capable of changing color in response to a heating device. Since the visible color of cholesteric liquid crystals can be changed with temperature, the heating and cooling ability of the heating devices can be used to adjust the color of the color-changing layer 13. Other materials capable of changing color in response to temperature can be also used as material of the color-changing layer 13, and the disclosure has no particular limitations herein. Additionally, the adaptive camouflage effect of the camouflage structure of the embodiment can be achieved by a magnetic driving method; for example, the magnetic coil can be constructed for altering the color of the color-changing layer 13. Additionally, the adaptive camouflage effect of the camouflage structure of the embodiment can be achieved by an optic driving method; for example, the color-changing layer 13 would change color in response to environmental light (ex: natural light) or a light source. Moreover, those elements such as the heating device, the magnetic coil or the light source can be constructed inside or outside the camouflage structure, for achieving the adaptive camouflage effect of the camouflage structure of the disclosure by optical driving methods, thermo-driving methods or magnetic driving methods.

Figure 2A:
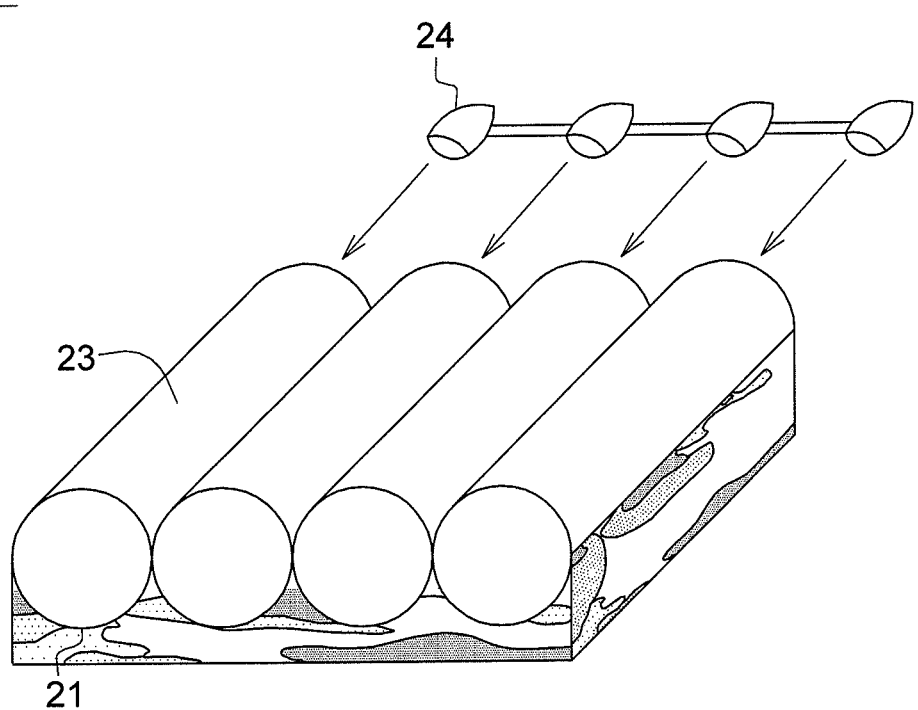
FIG. 2A illustrates a camouflage structure having a fiber optic assembly according to an embodiment of the disclosure.

FIG. 2A illustrates a camouflage structure having a fiber optic assembly according to an embodiment of the disclosure. As shown in FIG. 2A, the camouflage structure 20 includes a camouflage graphic layer 21, several optical fibers 23 (functioning as a color-changing layer) disposed on the camouflage graphic layer 21, and the light sources 24 positioned at one side of the optical fibers 23. The optical fibers 23 acts as a waveguide to transmit light. When the camouflage graphic layer 21 is a green camouflage graphic layer, the light sources 24 emit red light to the optical fibers 23. The optical fibers 23 disposed above the green camouflage graphic layer 21 then transmit and reflect red light, which allows for the overall appearance of the camouflage structure 20 to change from the greenish (woodland) camouflage to the brownish desert camouflage.

Figure 2B:
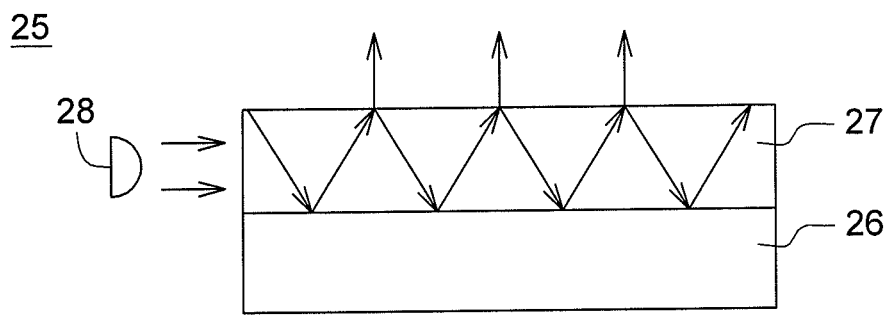
FIG. 2B illustrates a camouflage structure having a light guiding plate according to an embodiment of the disclosure.

FIG. 2B illustrates a camouflage structure having a light guiding plate according to an embodiment of the disclosure. As shown in FIG. 2B, the camouflage structure 25 includes a camouflage graphic layer 26, a light guide plate 27 (functioning as a color-changing layer) disposed on the camouflage graphic layer 26, and a light source 28 positioned at one side of the light guide plate 27. Similarly, when the camouflage graphic layer 26 is a green camouflage graphic layer, the light source 28 emits red light to the light guide plate 27. The light guide plate 27 disposed above the green camouflage graphic layer 26 then transmits and reflects red light, which allows for the overall appearance of the camouflage structure 25 to change from the greenish (woodland) camouflage to the brownish desert camouflage. Examples of the light sources 24 and 28 include light emitting diodes (LED) or other types of devices able to emit light. There is no particular limitation on the types of light sources.

Figure 3A:
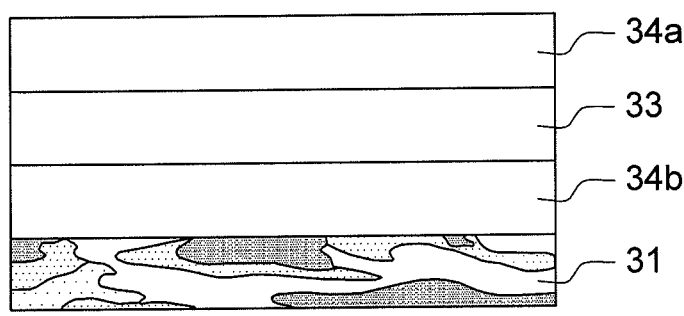
FIG. 3A~FIG. 3C respectively illustrate three different types of the camouflage structures having the electrode layers according to the first embodiment of the disclosure.
Figure 3B:
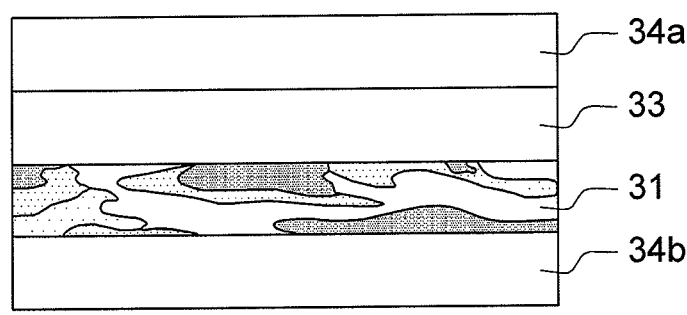
Figure 3C:
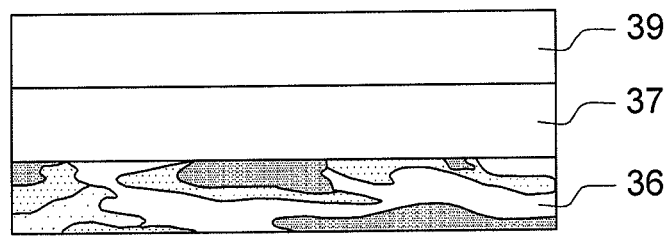

Furthermore, the adaptive camouflage effect of the camouflage structure of the embodiment can be achieved by an electric driving method; for example, an electrode layer is used for altering the color of the color-changing layer. FIG. 3A~FIG. 3C respectively illustrate three different types of the camouflage structures having the electrode layers according to the first embodiment of the disclosure.

As shown in FIG. 3A, the first type of the camouflage structure 30 includes a camouflage graphic layer 31, a color-changing layer 33, an upper electrode layer 34a and a lower electrode layer 34b respectively disposed above and beneath the color-changing layer 33. Also, both of the upper electrode layer 34a and the lower electrode layer 34b could be transparent electrodes for showing the color change effect of the camouflage structure 30.

Alternatively, the second type of the camouflage structure 30' as shown in FIG. 3B is applicable. In FIG. 3B, the lower electrode layer 34b of the camouflage structure 30' is disposed beneath the camouflage graphic layer 31. Also, the upper electrode layer 34a could be a transparent electrode, while the lower electrode layer 34b could be a transparent electrode or an opaque electrode for showing the color change effect of the camouflage structure 30'.

Alternatively, the third type of the camouflage structure 35 as shown in FIG. 3C is applicable if the camouflage graphic layer is conductive. In FIG. 3C, the conductive camouflage graphic layer 36 of the camouflage structure 35 acts as an lower electrode, and only one electrode, i.e. the upper electrode 39, is disposed on the color-changing layer 37. Also, the upper electrode layer 39 could be a transparent electrode for showing the color change effect of the camouflage structure 35.

Besides altering the appearance of the camouflage structure from the greenish (woodland) camouflage to the brownish desert camouflage by turning the color-changing layer on the green camouflage graphic layer red (as described above), the camouflage structure with a brownish desert camouflage graphic layer is also able to alter its appearance to the greenish camouflage after the color-changing layer changes color. Please refer to FIG. 3A. If the camouflage graphic layer 31 of the camouflage structure 30 in FIG. 3A is a brownish desert camouflage graphic layer, materials capable of absorbing red light can be used for making the color-changing layer 33. When the light arrives at the color-changing layer 33, the red light is absorbed by the color-changing layer 33, and only the blue light and the yellow light arrives at the camouflage graphic layer 31. The brownish desert camouflage graphic layer 31 reflects the yellow light and absorbs other color light. A red light and a green light mix together to form a yellow light. Since the red light is absorbed by the color-changing layer 33, and the brownish desert camouflage graphic layer 31 absorbs the blue light and reflects the green light, the camouflage structure presents a greenish (woodland) camouflage state.

The camouflage structure of the embodiment can be widely used in a variety of applications, including military gears and daily life products. The camouflage structure can be applied as the surface coverings of the military weapons, such as being the covering layers of the tank, the outer films of the helmets and firearms, and could also be used for making the army combat suits. Additionally, the camouflage structure could also be applied to the shells of daily life products and fabrics, to increase the values and functions of the products.

Figure 4:
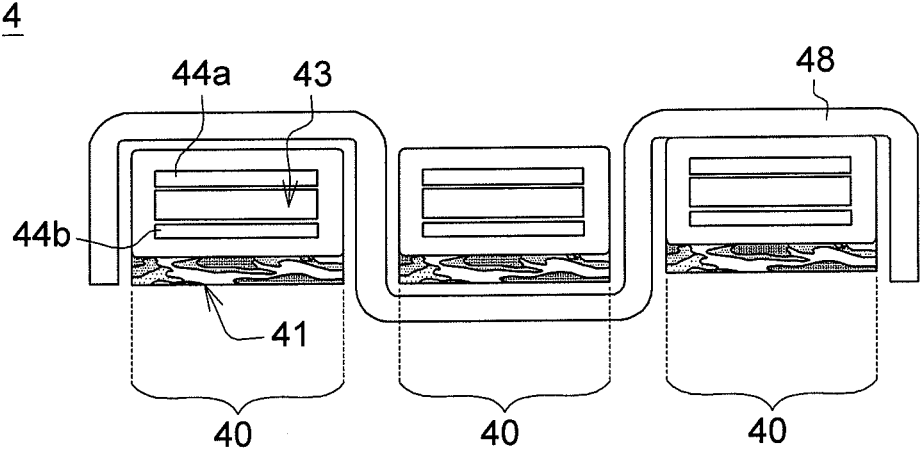
FIG. 4 depicts a fabric manufacture of the camouflage structures according to the embodiment of the disclosure.

FIG. 4 depicts a fabric manufacture of the camouflage structures according to the embodiment of the disclosure. In FIG. 4, the camouflage structures of FIG. 3, including the camouflage graphic layer 41, the color-changing layer 43, the upper electrode layer 44a and the lower electrode layer 44b, is used for making the color-changeable fibers 40 (in the shape of strips or threads). A color-changeable camouflage fabric is constructed by interlacing or interweaving strips or strands of the color-changeable fibers 40 and the typical transparent fibers 48, for producing the camouflage fabric as soft and flexible as the typical fabric. It is noted that the fabric manufacture can be accomplished by adopting other types of the camouflage structures of the embodiments as described above, and the camouflage structure of FIG. 3A is merely one of them.

Figure 5:
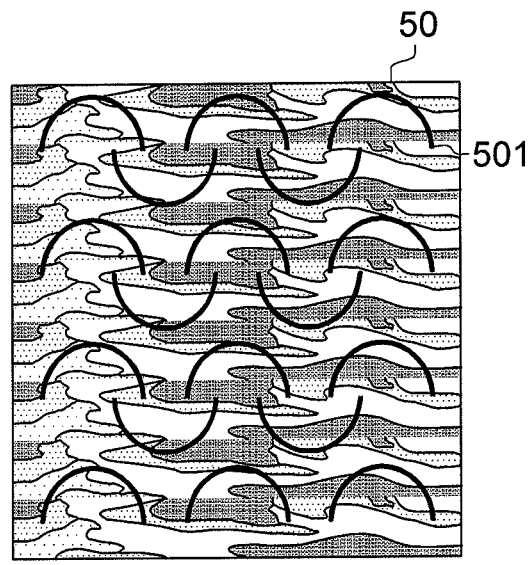
FIG. 5 depicts a color-changeable camouflage film manufactured by the camouflage structure according to the embodiment of the disclosure having several discontinuous cuttings.

Also, the camouflage structure of the embodiment could be further processed by applying several discontinuous cuttings, for increasing the flexibility and stretchability of the structure. As shown in FIG. 5, which depicts a color-changeable camouflage film 50 manufactured by the camouflage structure according to the embodiment of the disclosure having several discontinuous cuttings 501 so as to increase the stretchability. Also, the color-changeable camouflage film 50 with several discontinuous cuttings 501 is able to cover the curved surface of the object smoothly, and adaptive camouflage effect is improved consequently. Unlike the traditional pixelized method which uses multiple pixels to achieve the color-changing effect, those discontinuous cuttings cause no damage on the camouflage structure of the embodiment but flexibility and stretchability, since the color changing layer and the electrode layer(s) of the camouflage structure of the embodiment are entirely formed and operated as a whole.

According to the descriptions above, whether the camouflage structure of the embodiment is operated by one of the electric driving methods, optical driving methods, thermo-driving methods or magnetic driving methods, the color changing layer and the electrode layer(s) can be formed entirely as one piece over the camouflage graphic layer without using complicated patterning procedures. Thus, the camouflage structure of the embodiment can achieve the adaptive camouflage effect with the simple structural construction and low cost of fabrication.

Second Embodiment

Figure 6:
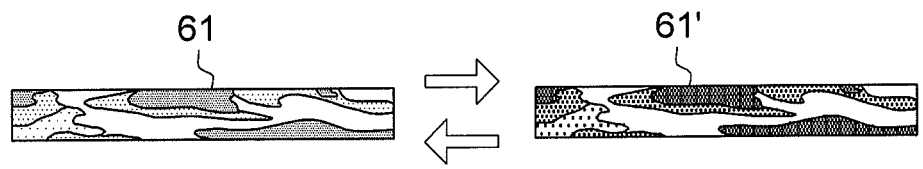
FIG. 6 simply illustrates a camouflage structure according to the second embodiment of the disclosure.

FIG. 6 simply illustrates a camouflage structure according to the second embodiment of the disclosure. The camouflage structure of FIG. 6 at least comprises a greenish camouflage graphic layer 61 made of at least one of chromic materials with red-shift characteristics (which means the greenish camouflage graphic layer 61 consists of different colors of chromic materials with reversible red-shift characteristics). The colors or tones of patterns of the greenish camouflage graphic layer 61 could comprise green, yellow and brown. Examples of the chromic materials of the greenish camouflage graphic layer 61 include electrochromic materials, photochromic materials, thermochromic materials and magnetochromic materials. The camouflage structure of the second embodiment can be operated by electric drive, optical drive, thermal drive or magnetic drive, corresponding to the materials of the chromic materials. When the greenish camouflage graphic layer 61 is red-shifted by an appropriate driving method, it can be turned to be a brownish desert camouflage layer 61'.

In this embodiment, the greenish camouflage graphic layer 61, consisting of different colors of chromic materials with reversible red-shift characteristics, is also able to presents at least one intermediate color state and further change color from the intermediate color state to a brownish desert camouflage state corresponding to the red-shifted extents of the chromic materials of the greenish camouflage graphic layer 61. The intermediate color state, for example, could be a dark green color with light tones of red. It is noted that the camouflage structure of the second embodiment can present several different intermediate color states depending on the red-shifted extents of the greenish camouflage graphic layer 61; and the greenish camouflage graphic layer 61 is also able to show many different intermediate colors due to the abundance of the chromic material selections. The presented intermediate colors are similar to the grayscale between black and white (which includes many different colors with different shades of gray, i.e. light gray to deep gray). Therefore, the invention has no particular limitation to the number of the intermediate colors.

Differing from the first embodiment, the greenish camouflage graphic layer 61 of the camouflage structure according to the second embodiment not only has camouflage pattern, but also is a combination of chromic materials per se. When a brownish desert camouflage is desired to reveal (ex: to match the object's background color), the greenish camouflage graphic layer 61 is red-shifted for turning to a brownish desert camouflage layer 61'. When a greenish camouflage is required to show (ex: to match the object's background color), the brownish desert camouflage layer 61' can turn back to the greenish camouflage color as the original greenish camouflage graphic layer 61, since the red-shift characteristics of the chromatic reaction is reversible.

Figure 7:
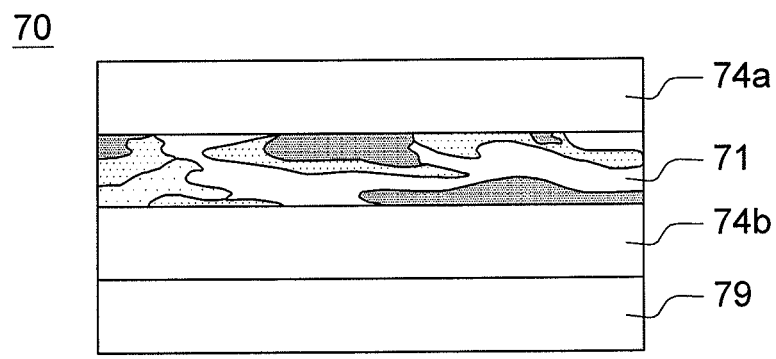
FIG. 7 illustrates the camouflage structures having the electrode layers according to the second embodiment of the disclosure.

Furthermore, the adaptive camouflage effect of the camouflage structure of the second embodiment could be achieved by an electric driving method. For example, two electrode layers can be disposed above and beneath the greenish camouflage graphic layer, respectively. FIG. 7 illustrates the camouflage structures having the electrode layers according to the second embodiment of the disclosure. The camouflage structure 70 of FIG. 7 includes a greenish camouflage graphic layer 71, an upper electrode layer 74a and a lower electrode layer 74b respectively disposed above and beneath the greenish camouflage graphic layer 71. The greenish camouflage graphic layer 71 is made of different colors of chromic materials with reversible red-shift characteristics. A transparent electrode could be used as the upper electrode layer 74a for showing the color change effect of the camouflage structure 70, while a transparent electrode or an opaque electrode could be used as the lower electrode layer 74b. Also, the substrate 79 in FIG. 7 is a carrier in the fabrication of the camouflage structure, acting as either a temporal base for carrying the greenish camouflage graphic layer 71 or a permanent part of the camouflage structure 70, depending on the requirements of practical applications.

Figure 8:
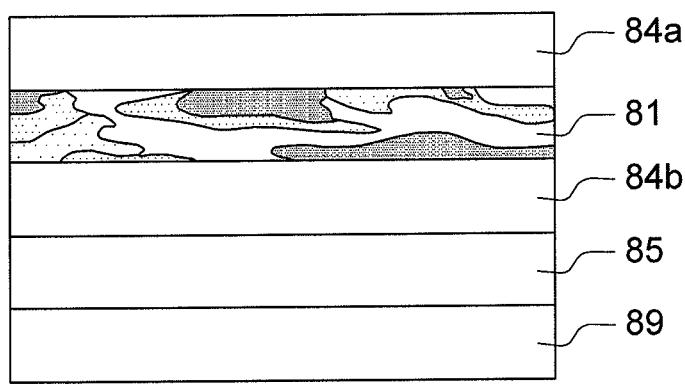
FIG. 8 illustrates another camouflage structures having the electrode layers according to the second embodiment of the disclosure.

FIG. 8 illustrates another camouflage structures having the electrode layers according to the second embodiment of the disclosure. The camouflage structure 80 of FIG. 8 includes a greenish camouflage graphic layer 81, an upper electrode layer 84a and a lower electrode layer 84b respectively disposed above and beneath the greenish camouflage graphic layer 81. In an embodiment, the chromic material of the greenish camouflage graphic layer comprises cholesteric liquid crystals. Furthermore, a light-absorbing layer 85 could be disposed between the lower electrode layer 84b and the substrate 89 (as shown in FIG. 8), or disposed between the lower electrode 84b and the greenish camouflage graphic layer 81 (not shown in the drawings). Also, transparent electrodes could be used as the upper electrode layer 84a and the lower electrode layer 84b. Similarly, the substrate 89 in FIG. 8 could be either a temporal base or a permanent part of the camouflage structure 80, depending on the requirements of practical applications.

Similarly, the camouflage structure of the second embodiment can be widely used in a variety of applications, including military gears (such as the covering layers of the military weapons and the army combat suits) and daily life products (such as the shells of daily life products and fabrics). As illustrated in FIG. 4 and related descriptions, the camouflage structure of the second embodiment can be used for making the color-changeable fibers, and a soft color-changeable camouflage fabric can be formed by interlacing or interweaving strips or strands of the color-changeable fibers and the typical transparent fibers. Additionally, the flexibility and stretchability of the camouflage structure of the second embodiment could be increased by applying several discontinuous cuttings, as illustrated in FIG. 5. Similarly, those discontinuous cuttings cause no damage on the camouflage structure of the second embodiment but flexibility and stretchability, thereby covering the curved surface of the object smoothly and improving the adaptive camouflage effect.

According to the aforementioned descriptions, the camouflage structure according to the embodiment of the disclosure is capable of altering its appearance between the greenish camouflage and the brownish desert camouflage, depending on the practical situation of the users. Also, the color of the camouflage structure can be optionally and easily transformed between many different color states by adjusting the color-changing extents of the color changing layer, thereby matching the colors of object's background and increasing the "invisibility" of the products in the applications. Furthermore, the structural construction of the camouflage structure according to the embodiment of the disclosure is simple and can be manufactured without using complicated patterning procedures. Thus, the camouflage structure easily achieves the adaptive camouflage effect with low cost of fabrication, and is suitable for mass productions. Additionally, the camouflage structure of the embodiment can be widely used in a variety of applications, such as military gears and daily life products, to increase the values and functions of the products in the applications.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A camouflage structure, comprising:
   a camouflage graphic layer;
   a color-changing layer, disposed on the camouflage graphic layer;
   a transparent upper electrode, disposed on the color-changing layer; and
   a transparent lower electrode, disposed beneath the camouflage graphic layer;
   wherein the camouflage structure originally presents a first color state, and presents a second color state after the color-changing layer changes the color by a driving method.

2. The camouflage structure according to claim 1, wherein the color-changing layer comprises a cholesteric liquid crystal.

3. The camouflage structure according to claim 1, wherein the camouflage graphic layer is a greenish camouflage graphic layer and the first color state is green, the color-changing layer is able to change color between transparent and red, so as to make the camouflage structure present a brownish desert camouflage state after the color-changing layer turns red.

4. The camouflage structure according to claim 1, wherein the camouflage graphic layer is a brownish desert camouflage graphic layer, when the light passes through the color-changing layer, the color-changing layer is able to absorb red light and the brownish desert camouflage graphic layer reflects green light, so as to make the camouflage structure present a greenish camouflage state.

5. The camouflage structure according to claim 1, wherein after the color-changing layer changes the color by the driving method, the camouflage structure turns to at least an intermediate color state from the first color state, and then turns to the second color state from the intermediate color state.

6. The camouflage structure according to claim 1 comprising a plurality of discontinuous cuttings.

7. The camouflage structure according to claim 1, wherein the driving method uses electric driving methods.

* * * * *